(12) United States Patent
Cho

(10) Patent No.: US 7,092,136 B2
(45) Date of Patent: Aug. 15, 2006

(54) LASER SCANNING UNIT

(75) Inventor: Jung-hyuck Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 10/827,315

(22) Filed: Apr. 20, 2004

(65) Prior Publication Data

US 2005/0024478 A1 Feb. 3, 2005

(30) Foreign Application Priority Data

Aug. 2, 2003 (KR) .............. 10-2003-0053586

(51) Int. Cl.
*G02B 26/08* (2006.01)
(52) U.S. Cl. .................... 359/204; 347/243
(58) Field of Classification Search ......... 359/204–206
See application file for complete search history.

(56) References Cited

U.S. PATENT DOCUMENTS

| | | | |
|---|---|---|---|
| 5,243,359 A | 9/1993 | Fisli | |
| 5,636,049 A * | 6/1997 | Kawata et al. | 359/211 |
| 5,995,267 A * | 11/1999 | Paoli | 359/204 |
| 6,061,079 A | 5/2000 | Ota et al. | |
| 6,396,615 B1 | 5/2002 | Hama et al. | |

FOREIGN PATENT DOCUMENTS

| | | |
|---|---|---|
| JP | 10-20608 | 1/1998 |
| JP | 2000-330049 | 11/2000 |
| JP | 2001-296492 | 10/2001 |

\* cited by examiner

*Primary Examiner*—Euncha P. Cherry
(74) *Attorney, Agent, or Firm*—Staas & Halsey LLP

(57) ABSTRACT

A laser scanning unit includes a light source unit generating a plurality of laser beams, at least one horizontal polarizer arranged on an optical axis of a part of the laser beams, at least one vertical polarizer arranged on an optical axis of a remainder of the laser beams, a polygon mirror deflecting, within a range of a predetermined angle, a horizontally-polarized beam and a vertically-polarized beam respectively generated by the horizontal and the vertical polarizers, and an optical filter passing a horizontally-polarized beam of the plurality of polarized beams deflected by the polygon mirror, and reflecting a vertically-polarized beam at a predetermined angle.

17 Claims, 4 Drawing Sheets

LASER SCANNING UNIT

CROSS-REFERENCE TO RELATED APPLICATIONS

This application claims the benefit of Korean Patent Application No. 2003-53586, filed on Aug. 2, 2003, in the Korean Intellectual Property Office, the disclosure of which is incorporated herein by reference.

BACKGROUND OF THE INVENTION

1. Field of the Invention

The present invention relates to a laser scanning unit used in an image forming apparatus, and more particularly, to a laser scanning unit simplified in construction and reducing the manufacturing processes.

2. Description of the Related Art

Generally, a laser scanning unit, provided in an electrophotographic image forming apparatus such as a photocopier or a printer, forms an electrostatic latent image by projecting a laser beam onto an electrically charged photosensitive medium.

The so-called 'tandem' type laser scanning unit, used in an image forming apparatus capable of color-printing, generates a plurality of laser beams and projects the laser beams to a plurality of photosensitive drums, respectively and simultaneously. One example of such a laser scanning unit is disclosed in U.S. Pat. No. 6,396,615, which includes a light source unit generating the laser beams, a polygon mirror reflecting the laser beams, a mirror group having a plurality of mirrors, and fθ lens group having a plurality of lenses. The light source unit is provided with a plurality of laser diodes and collimating lenses corresponding to the laser diodes. The laser beams generated at the respective laser diodes pass through the collimating lens and a cylinder lens and are projected onto the polygon mirror. The polygon mirror deflects four laser beams within a range of a predetermined angle while rotating at a high speed. Then, the laser beams, deflected by the polygon mirror, pass through first and second lenses of the fθ lens group, and are reflected by mirrors arranged on the optical axes of the laser beams in different directions, respectively. The reflected laser beams pass through a third lens of the fθ lens group arranged on the respective optical axes, and are projected onto the photosensitive drum.

However, in the conventional laser scanning unit, there are many lenses arranged on the optical axes from the laser diodes to the photosensitive drums, such as collimating lenses, cylinder lens, and lenses of the fθ lens group, and the arrangement of mirrors for reflecting the laser beams to the photosensitive drums is also complicated. Therefore, there is a problem of increasing manufacturing costs and manufacturing processes.

SUMMARY OF THE INVENTION

The present invention has been developed in order to solve the above and/or other problems in the related art. Accordingly, it is an aspect of the present invention to provide a laser scanning unit, in which a construction is entirely simplified, and manufacturing processes are reduced by reducing the number of lenses arranged along an optical axis and simplifying the arrangement of the mirrors.

The above and/or other aspects are achieved by providing a laser scanning unit comprising a light source unit generating a plurality of laser beams, a horizontal polarizer arranged on an optical axis of at least one of the laser beams, a vertical polarizer arranged on an optical axis of at least one of the other laser beams, a polygon mirror deflecting a horizontally-polarized beam and a vertically-polarized beam respectively generated by the horizontal and the vertical polarizers within a range of a predetermined angle, and an optical filter passing a horizontally-polarized beam of the plurality of polarized beams deflected by the polygon mirror, and reflecting a vertically-polarized beam at predetermined angle.

Between the light source unit and the horizontal and the vertical polarizers at least one collimating lens and at least one cylinder lens are provided, the collimating lens for transforming the laser beams into parallel beams, the cylinder lens for transforming the parallel beams into linear beams of horizontal directionality.

Also, between the light source unit and the horizontal and the vertical polarizers a first mirror group is provided, having a plurality of mirrors to reflect the laser beams to the horizontal and the vertical polarizers.

Also, the laser scanning unit of claim 1, further comprises a second mirror group comprising a plurality of mirrors to reflect onto a plurality of photosensitive media the laser beams from the optical filter.

Also, between the polygon mirror and the optical filter an fθ lens is provided, to refract the laser beams in a scanning direction.

Also, the optical filter is a beam splitter or a glass having a curvature to form a Brewster's angle.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
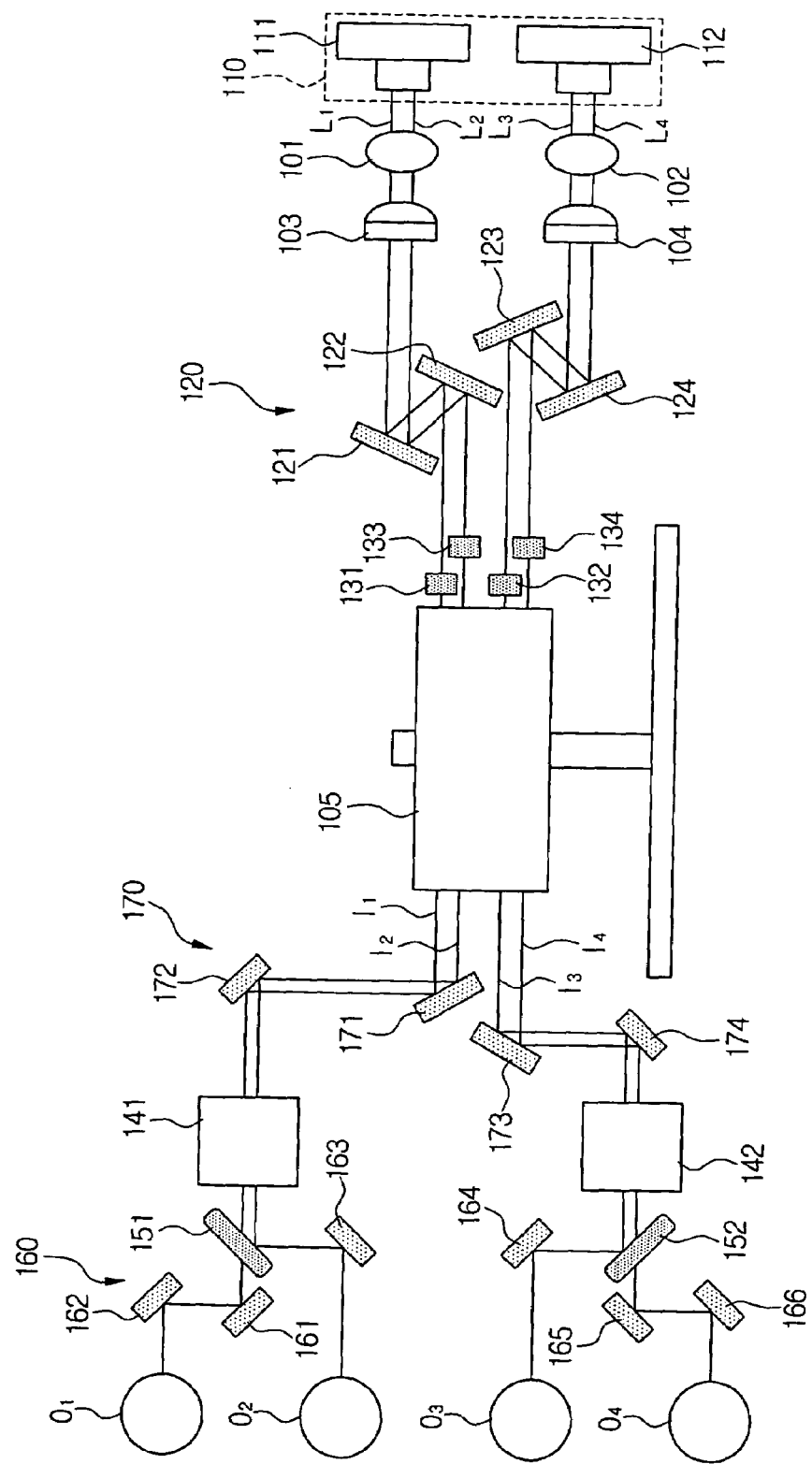
FIG. 1 is a view schematically showing a laser scanning unit according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in FIG. 1, a laser scanning unit according to a first embodiment of the present invention, includes a light source unit 110, first and second collimating lenses 101, 102, first and second cylinder lenses 103, 104, a first mirror group 120, first and second horizontal polarizers 131, 132, first and second vertical polarizers 133, 134, a polygon mirror 105, first and second fθ lenses 141, 142, first and second optical filters 151, 152, a second mirror group 160, and a third mirror group 170.

The light source unit 110 includes a first laser diode unit 111 for generating first and second laser beams $L_1$, $L_2$, and a second laser diode unit 112 for generating third and fourth laser beams $L_3$, $L_4$. Also, each laser diode unit 111,112 has a laser diode (not shown) for generating a laser beam.

The first and the second collimating lens 101 and 102 transform the laser beams emitted from the light source unit 110 into parallel beams. The first collimating lens 101 is arranged on an optical axes of the first and the second laser beams $L_1$, $L_2$, while the second collimating lens 102 is arranged on an optical axes of the third and the fourth laser beams $L_3$, $L_4$.

The first and the second cylinder lenses 103, 104 transform the laser beams into linear beams. The first cylinder lens 103 is arranged on an optical axes of the first and the second laser beams $L_1$, $L_2$, which pass through the first collimating lens 101, while the second cylinder lens 104 is arranged on an optical axes of the third and the fourth laser beams $L_3$, $L_4$, which pass through the second collimating lens 102.

The first mirror group 120 has four mirrors 121, 122, 123, 124 to change light paths of the respective leaser beams $L_1$, $L_2$, $L_3$, and $L_4$. The change of the light paths causes a width between the optical axes of the first and the fourth laser beam $L_1$ and $L_4$ to be reduced, and thus allows all the laser beams $L_1$, $L_2$, $L_3$, and $L_4$ to be incident on a reflecting surface of the polygon mirror 105. Of the four mirrors 121, 122, 123, 124, two mirrors 121 and 122 are arranged on the optical axes of the first and the second laser beams $L_1$, $L_2$, respectively, which pass through the first cylinder lens 103, to change the light paths of the first and the second laser beams $L_1$, $L_2$. Whereas, the other two mirrors 123, 124 are arranged on the optical axes of the third and the fourth laser beams $L_3$, $L_4$, respectively, which pass through the second cylinder lens 104, to change the light paths of the third and the fourth laser beams $L_3$, $L_4$.

Figure 2:
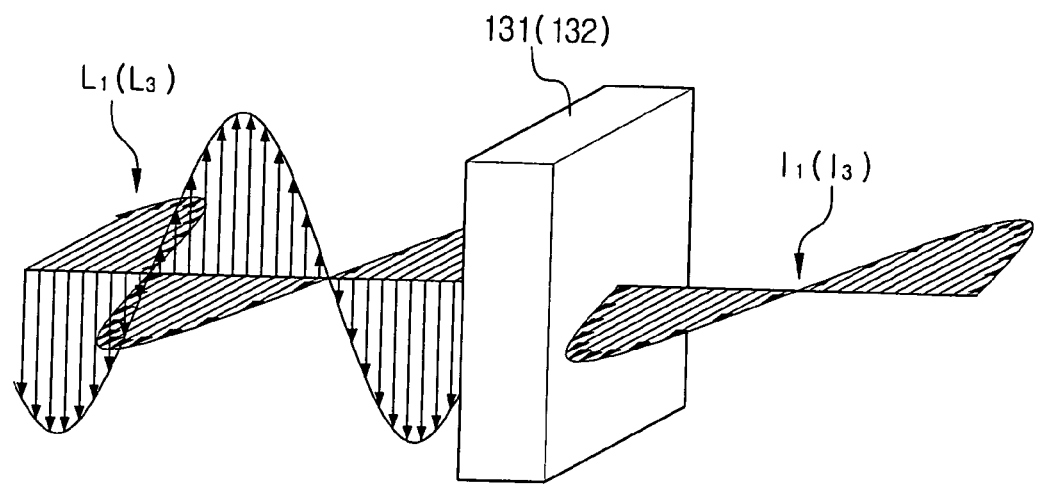
FIGS. 2 and 3 are views showing the operations of the polarizers provided in the laser scanning unit of FIG. 1.

The first and the second horizontal polarizers 131, 132 horizontally polarize the laser beams, and are respectively arranged on the optical axes of the first and the third laser beams $L_1$, $L_3$ among the laser beams $L_1$, $L_2$, $L_3$, $L_4$ reflected from the first mirror group 120. As shown in FIG. 2, the horizontal polarizer 131 passes only the horizontal component among vertical and horizontal components of the first laser beam $L_1$. Accordingly, by passing through the first horizontal polarizer 131, the first laser beam $L_1$ is transformed into a first horizontally-polarized beam $l_1$, in which a vertical component is removed. The third laser beam $L_3$ is also transformed into a second horizontally-polarized light $l_3$, in which the vertical component is removed, by passing through the second horizontal polarizer 132.

Figure 3:
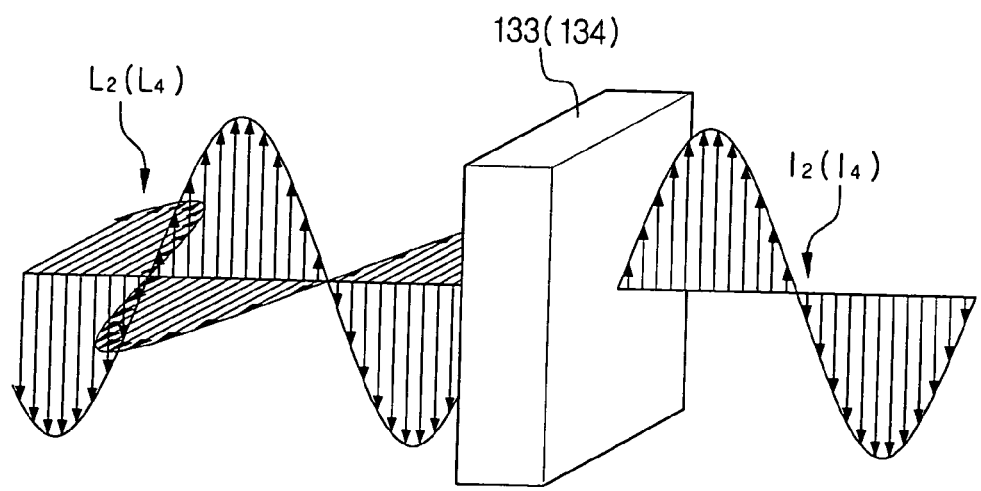

The first and the second vertical polarizers 133, 134 vertically polarize the laser beams, and are respectively arranged on the optical axes of the second and the fourth laser beams $L_2$, $L_4$ among the laser beams $L_1$, $L_2$, $L_3$, $L_4$ reflected from the first mirror group 120. As shown in FIG. 3, the vertical polarizer 133 passes only the vertical component of the vertical and horizontal components of the second laser beam $L_2$. Accordingly, by passing through the first vertical polarizer 133, the second laser beam $L_2$ is transformed into a first vertically-polarized beam $l_2$, from which the horizontal component is removed. The fourth laser beam $L_4$ is also transformed into a second vertically-polarized light $l_4$, from which the horizontal component is removed, by passing through the second vertical polarizer 134.

Meanwhile, it is possible to interchange the positions of the first horizontal polarizer 131 and the first vertical polarizer 133. The changing of the positions of the second horizontal polarizer 132 with the second vertical polarizer 134 is also possible. That is, the first vertical polarizer 133 may be arranged on the optical axis of the first laser beam $L_1$, and the first horizontal polarizer 131 may be arranged on the optical axis of the second laser beam $L_2$. Also, the second vertical polarizer 134 may be arranged on the optical axis of the third laser beam $L_3$, and the second horizontal polarizer 132 may be disposed on the optical axis of the fourth laser beam $L_4$. The positions of the vertical polarizer and the horizontal polarizer can be interchanged for only if a horizontal polarizer is arranged on one optical axis of the laser beam pair, while a vertical polarizer is arranged on the other optical axis.

The polygon mirror 105 deflects the plurality of polarized beams $l_1$, $l_2$, $l_3$, $l_4$, which are generated through the respective polarizers 131, 132, 133, 134, within a range of a predetermined angle. The polygon mirror 105 has a plurality of reflecting surfaces and rotates at a high speed. The parallel polarized beams $l_1$, $l_2$, $l_3$, $l_4$ incident onto the reflecting surfaces of the polygon mirror 105 are simultaneously reflected in the same direction.

The first and the second fθ lenses 141, 142 refract the plurality of polarized beams $l_1$, $l_2$, $l_3$, $l_4$, which are reflected from the polygon mirror 105 and the third mirror group 170, in a scanning direction of the photosensitive drum, and focus the beams onto the photosensitive drums to smoothly form an electrostatic latent image. In here, the first fθ lens 141 is arranged on the optical axes of the first horizontally-polarized beam $l_1$ and the first vertically-polarized beam $l_2$, while the second fθ lens 142 is arranged on the optical axes of the second horizontally-polarized beam $l_3$ and the second vertically-polarized beam $l_4$.

The first and the second optical filters 151 and 152 separate the polarized beams $l_1$, $l_2$, $l_3$, and $l_4$ which are passed through the first and the second fθ lenses 141, 142. The first optical filter 151 is arranged on the optical axes of the first horizontally-polarized beam $l_1$ and the first vertically-polarized beam $l_2$ from the fθ lens 141, while the second optical filter 152 is arranged on the optical axes of the second horizontally-polarized beam $l_3$ and the second vertically-polarized beam $l_4$ from the fθ lens 142. In here, the first optical filter 151 passes the first horizontally-polarized beam $l_1$, while reflecting the first vertically-polarized beam $l_2$ in a perpendicular direction to the first horizontally-polarized beam $l_1$. Also, the second optical filter 152 passes the second vertically-polarized beam $l_4$, while reflecting the second horizontally polarized beam $l_3$ in a perpendicular direction to the second vertically-polarized beam $l_4$. While it is important that the first and the second optical filters 151, 152 separate the polarized beams, it doesn't matter which of the horizontally-polarized beams and which of the vertically-polarized beams are passed or reflected by the optical filter. That is, the optical filter may be configured to pass a horizontally polarized beam, while reflecting a vertically polarized beam, or pass a vertically-polarized beam, while reflecting a horizontally-polarized beam. The first and the second optical filters 151 and 152 may be beam splitters, or glasses having a curvature to form a Brewster's angle.

The second mirror group 160 reflects the plurality of polarized beams $l_1$, $l_2$, $l_3$, $l_4$ from the first and the second optical filter 151, 152 onto photosensitive drums $O_1$, $O_2$, $O_3$, $O_4$, and has a plurality of mirrors 161, 162, 163, 164, 165, 166. The first horizontally-polarized beam $l_1$ from the first optical filter 151 is reflected onto the first photosensitive drum $O_1$ by two mirrors 161 and 162, while the first vertically-polarized beam $l_2$ from the first optical filter 151 is reflected onto the second photosensitive drum $O_2$ by one mirror 163. Also, the second horizontally-polarized beam $l_3$ from the second optical filter 152 is reflected onto the third photosensitive drum $O_3$ by one mirror 164, while the second vertically-polarized beam $l_4$ from the second optical filter 152 is reflected onto the fourth photosensitive drum $O_4$ by two mirrors 165, 166. Since the mirrors of the second mirror group 160 can be varied in number and position according to the arrangement of the photosensitive drums $O_1$, $O_2$, $O_3$, $O_4$ and spaces among the photosensitive drums $O_1$, $O_2$, $O_3$, $O_4$, there may be no mirror on the optical axis of the first horizontally-polarized beam $l_1$ from the first optical filter 151 or the optical axis of the second vertically-polarized beam $l_4$ from the second optical filter 152. In this case, the first horizontally-polarized beam $l_1$ from the first optical filter 151 is directly projected onto the first photosensitive drum $O_1$, and the second vertically-polarized beam $l_4$ from the second optical filter 152 is also directly projected onto the fourth photosensitive drum $O_4$.

The third mirror group 170 reflects the first horizontally-polarized beam $l_1$ and the first vertically-polarized beam $l_2$ among the plurality of polarized beams $l_1$, $l_2$, $l_3$, $l_4$ from the polygon mirror 105 onto the first fθ lens 141, while reflecting the second horizontally-polarized beam $l_3$ and the second vertically-polarized beam $l_4$ onto the second fθ lens 142. The third mirror group 170 includes a plurality of mirrors 171, 172, 173, 174. Due to the two upper mirrors 171, 172, the first horizontally-polarized beam $l_1$ and the first vertically-polarized beam $l_2$ change their light paths toward the first fθ lens 141, while, due to the two lower mirrors 173, 174, the second horizontally-polarized beam $l_3$ and the second vertically-polarized beam $l_4$ change their light paths toward the second fθ lens 142. The mirrors of the third mirror group 170 can be varied in number and position according to the positions of the first and the second fθ lenses 141, 142.

Hereinafter, the operation of the laser scanning unit according to the first embodiment of the present invention will be described in greater detail with reference to the accompanying drawings.

When the light source unit 110 receives image data signals from a controller (not shown), the first through fourth laser beams $L_1$, $L_2$, $L_3$, $L_4$ are simultaneously generated at the first and the second laser diode units 111, 112. The first and the second laser beams $L_1$, $L_2$ are projected from the light source unit 110, and are transformed into parallel beams by passing through the first collimating lens 101 and are again transformed into linear beams by passing through the first cylinder lens 103. Identically, the third and the fourth laser beams $L_3$, $L_4$ sequentially pass through the second collimating lens 102 and the second cylinder lens 102, to thereby be transformed into parallel beams and then into linear beams.

After that, the first and the second laser beams $L_1$, $L_2$ are reflected by two upper mirrors 121, 122 of the first mirror group 120 to thus change light paths, and respectively fall incident on the first horizontal polarizer 131 and the first vertical polarizer 133. The third and the fourth laser beams $L_3$, $L_4$ also change their light paths by two lower mirrors 123, 124, and are respectively incident on the second horizontal polarizer 132 and the second vertical polarizer 134. At this time, as shown in FIG. 2, the first and the third laser beams $L_1$, $L_3$ incident on the first and the second horizontal polarizers 131, 132 are transformed into the first and the second horizontally-polarized beams $l_1$, $l_3$, from which the vertical component is removed. However, as shown in FIG. 3, the second and the fourth laser beam $L_2$, $L_4$ are transformed into the first and the second vertically-polarized beams $l_2$, $l_4$, from which the horizontal component is removed. The horizontally and vertically polarized laser beams are reflected by the polygon mirror 150, and change their light paths by the mirrors 171 and 172 of the third mirror group 170 in a vertical direction. The first horizontally and vertically polarized beams $l_1$, $l_2$ change their light paths due to two upper mirrors 173, 174 of the third mirror group 170 to be incident on the first fθ lens 141, while the second horizontally and vertically polarized beams $l_3$, $l_4$ are reflected onto the second fθ lens 142 by the two lower mirrors 173, 174 of the third mirror group 170.

The first horizontally and vertically polarized beams $l_1$, $l_2$ from the first fθ lens 141 are incident on the first optical filter 151. In here, the first horizontal-polarized beam $l_1$, passes through the first optical filter 151, and changes its light path due to the two mirrors 161 and 162 of the second mirror group 160, and is then projected onto the first photosensitive drum $O_1$. The first vertically-polarized beam $l_2$ is reflected by the first optical filter 151 in a perpendicular direction to the first horizontally-polarized beam $l_1$, and is reflected by the mirror 163 of the second mirror group 160 onto the second photosensitive drum $O_2$. Also, the second horizontally and vertically polarized beam $l_3$, $l_4$ from the second fθ lens 142 are incident on the second optical filter 152. In here, the second horizontal-polarized beam $l_3$ is reflected by the second optical filter 152 in an upright direction and is then projected by the mirror 164 of the second mirror group 160 onto the third photosensitive drum $O_3$. The second vertically-polarized beam $l_4$ passes through the second optical filter 152, and changes its light path due to the two mirrors 165 and 166 of the second mirror group 160, and is then projected onto the fourth photosensitive drum $O_4$.

Figure 4:
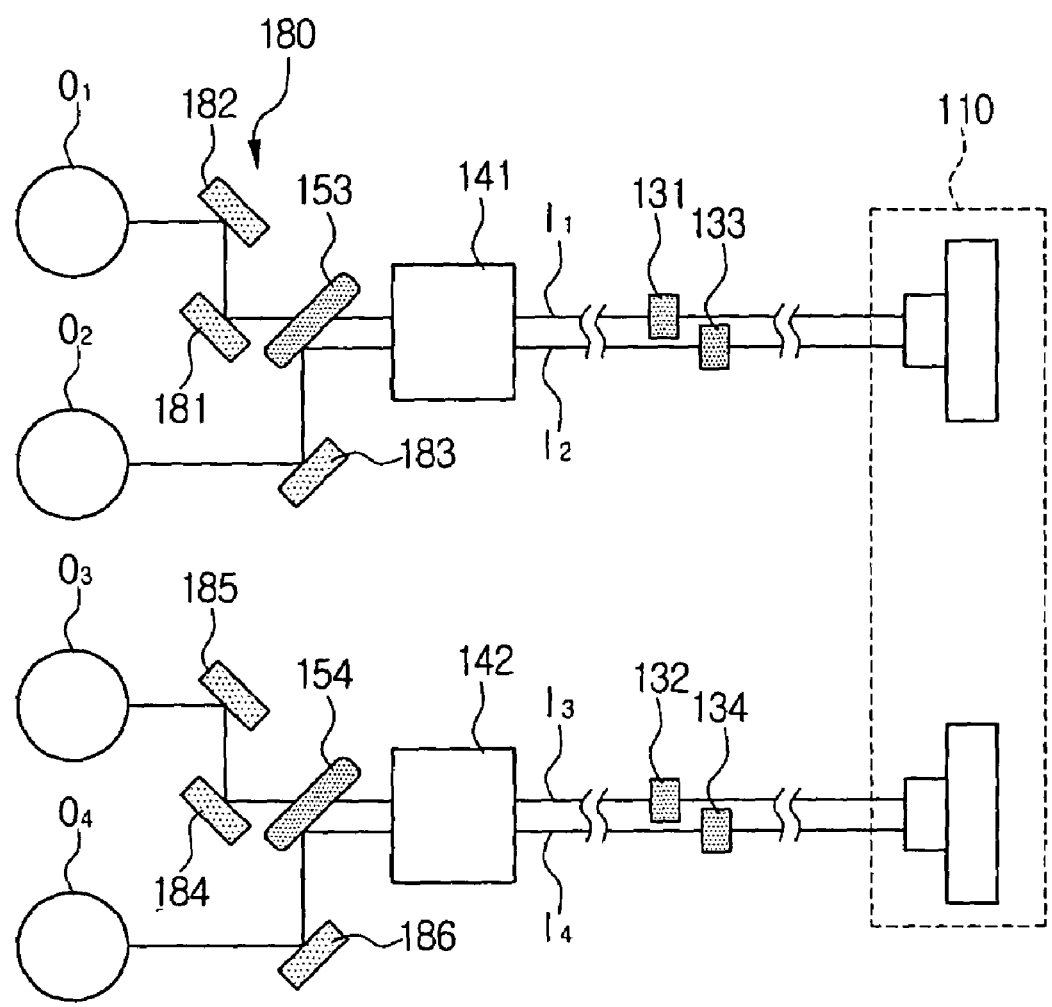
FIGS. 4 and 5 are views showing laser scanning units according to a second and a third embodiment of the present invention.
Figure 5:
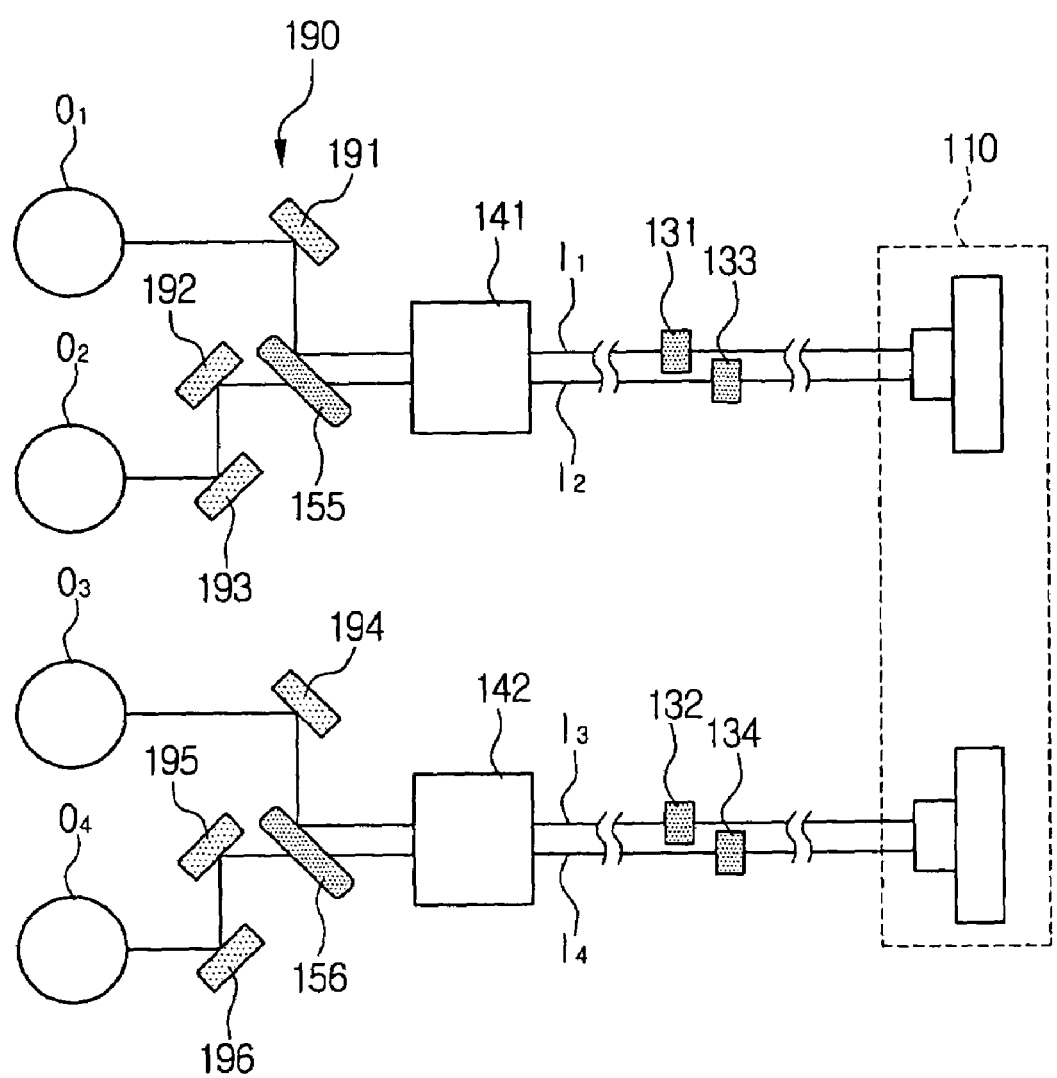

Meanwhile, FIGS. 4 and 5 illustrate laser scanning units according to a second and a third embodiment of the present invention, with some modifications in the construction of the first and the second optical filters. That is, there are differences in the construction of the two optical filters and the second mirror group from those of the aforementioned first embodiment, but the other parts are identical to those of the first embodiment. Accordingly, the parts omitted in the drawings will be described with the same reference numerals as those of FIG. 1.

Since the operations performed from the light source unit 110 to the third mirror group 170 in the second embodiment of FIG. 4 are the same as those of the laser scanning unit in the first embodiment, descriptions thereof will be omitted. And therefore, the operations after the time that the laser beams are passed through the fθ lenses, will be described. The first horizontally-polarized beam $l_1$ and the first vertically-polarized beam $l_2$ from the first fθ lens 141 are incident on a first optical filter 153. At this time, after passing through the first optical filter 153, the first horizontally-polarized beam $l_1$ changes its light path by two mirrors 181 and 182 of a second mirror group 180, and is then projected onto the first photosensitive drum $O_1$. The first vertically-polarized beam $l_2$ is reflected by the first optical filter 153 in a perpendicular direction to the first horizontally-polarized beam $l_1$, and changes its light path by a mirror 183 of the second mirror group 180, and is then projected onto the second photosensitive drum $O_2$. Also, the second horizontally-polarized beam $l_3$ and the second vertically-polarized beam $l_4$ from the second fθ lens 142 are incident on a second optical filter 154. Like the first optical filter 153, the second optical filter 154 is designed to pass the horizontally-polarized beam there through, while reflecting the vertically-polarized beam. Accordingly, the second horizontally-polarized beam $l_3$ is passed through the second optical filter 154, and is reflected by the two mirrors 184, 185 of the second mirror group 180, and then projected onto the third photosensitive drum $O_3$. The second vertically-polarized beam $l_4$ is reflected by the second optical filter 154 in a perpendicular direction to the second horizontally-polarized beam $l_3$, and changes its light path by a mirror 186 of the second mirror group 180, and is then projected onto the fourth photosensitive drum $O_4$. In this embodiment, the positions of the first horizontal polarizer 131 and the first vertical polarizer 133 may be changed for each other, and the changing of the positions of the second horizontal polarizer 132 and the second vertical polarizer 134 is also possible. The first and the second optical filters 153, 154 may be beam splitters, or glasses having a curvature to form a Brewster's angle.

In the third embodiment of FIG. 5, the operations performed from the light source unit 110 to the third mirror group 170 are the same as those of the laser scanning unit in the aforementioned first embodiment. However, in the third embodiment, first and second optical filters 155, 156 are both designed to reflect a horizontally-polarized beam and pass a vertically-polarized beam there through. The first horizontally-polarized beam $l_1$ and the first vertically-polarized beam $l_2$ from the first fθ lens 141 are incident on a first optical filter 155. At this time, the first horizontally-polarized beam $l_1$ is reflected in an upward vertical direction, and changes its light path by a mirror 191 of a second mirror group 190, and is then projected onto the first photosensitive drum $O_1$. Whereas, the first vertically-polarized beams $l_2$ is passed through the first optical filter 155, and is reflected by two mirrors 192, and 193 of the second mirror group 190, and is then projected onto the second photosensitive drum $O_2$. Also, the second horizontally-polarized beam $l_3$ and the second vertically-polarized beam $l_4$ from the second fθ lens 142 are incident on the second optical filter 156. The second horizontally-polarized beam $l_3$ is reflected by the second optical filter 156, and changes its light path by a mirror 194 of the second mirror group 190, and is then projected onto the third photosensitive drum $O_3$. Whereas, the second vertically-polarized beam $l_4$ is passed through the second optical filter 156, and is reflected by two mirrors 195, 196 of the second mirror group 190, and is then projected onto the fourth photosensitive drum $O_4$. Like the aforementioned first and second embodiments, the positions of the first horizontal polarizer 131 and the first vertical polarizer 133 may be changed for each other, and the changing of the positions of the second horizontal polarizer 132 and the second vertical polarizer 134 is also possible. The first and the second optical filters 155, 156 may be beam splitters, or glasses having a curvature to form a Brewster's angle.

According to the present invention as described above, the plurality of laser beams $L_1$, $L_2$, $L_3$, $L_4$ are transformed into horizontally-polarized beams and vertically-polarized beams by the polarizing process, and the polarized beams are separated by the optical filters, changing their respective light paths. That is, since the respective light paths of the laser beams $L_1$, $L_2$, $L_3$, $L_4$ can be variously changed while passing from the light source unit 110 to the plurality of photosensitive drum O1, O2, O3, and O4, the parts such as fθ lens 141, 142 are reduced in number and as a result, the arrangements of the mirrors are simplified. Accordingly, the laser scanning unit with reduced manufacturing cost and manufacturing process can be realized.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A laser scanning unit comprising:
a light source unit generating a plurality of laser beams of unpolarized light;
a horizontal polarizer arranged on an optical axis of at least one of the plurality of laser beams;
a vertical polarizer arranged on all of the other optical axis of the plurality of laser beams;
a polygon mirror deflecting a horizontally-polarized beam and a vertically-polarized beam respectively generated by the horizontal and the vertical polarizers within a range of a predetermined angle; and
an optical filter passing a horizontally-polarized beam of the plurality of polarized beams deflected by the polygon mirror, and reflecting a vertically-polarized beam at a specified angle from the horizontally-polarized beam.

2. The laser scanning unit of claim 1, further comprising at least one collimating lens between the light source unit and the horizontal and the vertical polarizers, to transform the laser beams into parallel beams.

3. The laser scanning unit of claim 1, further comprising at least one cylinder lens between the light source unit and the horizontal and the vertical polarizers, to transform the laser beams into linear beams.

4. The laser scanning unit of claim 1, further comprising at least one collimating lens and at least one cylinder lens between the light source unit and the horizontal and the vertical polarizers, the collimating lens transforming the laser beams into parallel beams, the cylinder lens transforming the parallel beams into linear beams of horizontal directionality.

5. The laser scanning unit of claim 1, further comprising a first mirror group having a plurality of mirror between the light source unit and the horizontal and the vertical polarizers, to reflect the laser beams to the horizontal and the vertical polarizers.

6. The laser scanning unit of claim 5, further comprising a second mirror group comprising a plurality of mirrors to reflect the laser beams from the optical filter onto a plurality of photosensitive media.

7. The laser scanning unit of claim 1, further comprising an fθ lens between the polygon mirror and the optical filter, to refract the laser beams in a scanning direction.

8. The laser scanning unit of claim 1, wherein the optical filter is a beam splitter.

9. The laser scanning unit of claim 1, wherein the optical filter is a glass having a curvature to form a Brewster's angle.

10. A laser scanning unit comprising:
a light source unit generating a plurality of laser beams of unpolarized light;
horizontal and vertical polarizers arranged on an optical axis of the plurality of laser beams;
a polygon mirror deflecting a horizontally-polarized beam and a vertically-polarized beam respectively generated by the horizontal and the vertical polarizers within a predetermined angle range;
a first optical filter passing the horizontally-polarized beam deflected by the polygon mirror, and reflecting the vertically-polarized beam;
a second optical filter reflecting the horizontally-polarized beam deflected by the polygon mirror, and passing the vertically-polarized beam; and a plurality of mirrors reflecting the laser beams from the first and second optical filters onto a plurality of photosensitive media.

11. The laser scanning unit of claim 10, further comprising at least one collimating lens between the light source unit and the horizontal and the vertical polarizers, to transform the laser beams into parallel beams.

12. The laser scanning unit of claim 10, further comprising at least one cylinder lens between the light source unit and the horizontal and the vertical polarizers, to transform the laser beams into linear beams.

13. The laser scanning unit of claim 10, further comprising at least one collimating lens and at least one cylinder lens between the light source unit and the horizontal and the vertical polarizers, the collimating lens transforming the laser beams into parallel beams, the cylinder lens transforming the parallel beams into linear beams of horizontal directionality.

14. The laser scanning unit of claim 10, further comprising a mirror group having a plurality of mirrors between the light source unit and the horizontal and the vertical polarizers, to reflect the laser beams to the horizontal and the vertical polarizers.

15. The laser scanning unit of claim 10, further comprising an fθ lens between the polygon mirror and the first and second optical filters to refract the laser beams in a scanning direction.

16. The laser scanning unit of claim 10, wherein the first and second optical filters are beam splitters.

17. The laser scanning unit of claim 10, wherein the first and second optical filters are glasses having a curvature to form a Brewster's angle.

* * * * *